US012717172B2

(12) United States Patent
Ding et al.

(10) Patent No.: US 12,717,172 B2
(45) Date of Patent: Aug. 25, 2026

(54) OPTICAL ARTICLE WITH IMPROVED VISUAL COMFORT

(71) Applicant: Essilor International, Charenton-le-Pont (FR)

(72) Inventors: Xingzhao Ding, Singapore (SG); Yu Liu, Singapore (SG)

(73) Assignee: Essilor International, Charenton-le-Pont (FR)

( * ) Notice: Subject to any disclaimer, the term of this patent is extended or adjusted under 35 U.S.C. 154(b) by 257 days.

(21) Appl. No.: 18/562,618

(22) PCT Filed: Apr. 12, 2022

(86) PCT No.: PCT/EP2022/059740
§ 371 (c)(1),
(2) Date: Nov. 20, 2023

(87) PCT Pub. No.: WO2022/248115
PCT Pub. Date: Dec. 1, 2022

(65) Prior Publication Data

US 2024/0255779 A1 Aug. 1, 2024

(30) Foreign Application Priority Data

May 26, 2021 (EP) .................................... 21305681

(51) Int. Cl.
*G02C 7/10* (2006.01)

(52) U.S. Cl.
CPC .................................... *G02C 7/107* (2013.01)

(58) Field of Classification Search
CPC ...... G02B 5/282; G02B 5/208; G02B 5/0883; G02B 1/10; G02B 1/11; G02B 1/115;
(Continued)

(56) References Cited

U.S. PATENT DOCUMENTS

2015/0241602 A1 8/2015 Avetisian, Sr. et al.
2015/0293284 A1 10/2015 Tatemura
2019/0171039 A1 6/2019 Ding et al.

FOREIGN PATENT DOCUMENTS

CN 107430211 12/2017
CN 107636495 1/2018
(Continued)

OTHER PUBLICATIONS

International Search Report and Written Opinion issued in corresponding PCT Application No. PCT/EP2022/059740, mailed Jul. 29, 2022.

*Primary Examiner* — Jie Lei
(74) *Attorney, Agent, or Firm* — Norton Rose Fulbright US LLP

(57) ABSTRACT

This optical article has a back face on the side of a wearer's eye, a front face opposite to the back face and, on at least one of the front and back faces, an interferential multilayer coating comprising a stack of at least one layer of high refractive index material having a refractive index higher than 1.55 and at least one layer of low refractive index material having a refractive index of 1.55 or less, the refractive indexes being expressed for a wavelength of 550 nm. The optical article is designed in such a manner that it has high reflective properties for low incident angles when viewing the article from its front or back face and antireflective properties for high incident angles when viewing the article from its front or back face.

12 Claims, 11 Drawing Sheets

(58) Field of Classification Search
CPC .......... G02B 1/116; G02B 1/14; G02B 1/105; G02C 7/10; G02C 7/107
USPC ....... 359/601, 580, 581, 584–589, 359, 360, 359/884; 351/159.62, 159.65, 44
See application file for complete search history.

(56) References Cited

FOREIGN PATENT DOCUMENTS

| | | |
|---|---|---|
| EP | 3118658 | 1/2017 |
| EP | 3301488 | 4/2018 |
| EP | 3627194 | 3/2020 |
| WO | WO 2018/073023 | 4/2018 |

| $SiO_2$ | 130 nm |
| --- | --- |
| $Ta_2O_5$ | 160 nm |
| $SiO_2$ | 106 nm |
| $Ta_2O_5$ | 26 nm |
| $SiO_2$ | 7 nm |
| $Ta_2O_5$ | 95 nm |
| HC | |

PRIOR ART

| $SiO_2$ | 103 nm |
| --- | --- |
| $Ta_2O_5$ | 87 nm |
| $SiO_2$ | 223 nm |
| $Ta_2O_5$ | 63 nm |
| $SiO_2$ | 35 nm |
| $Ta_2O_5$ | 32 nm |
| HC | |

| $SiO_2$ | 153 nm |
|---|---|
| $ZrO_2$ | 161 nm |
| $SiO_2$ | 103 nm |
| $ZrO_2$ | 43 nm |
| $SiO_2$ | 16 nm |
| $ZrO_2$ | 90 nm |
| HC | |

| $SiO_2$ | 119 nm |
|---|---|
| $ZrO_2$ | 63 nm |
| $SiO_2$ | 258 nm |
| $ZrO_2$ | 49 nm |
| $SiO_2$ | 52 nm |
| $ZrO_2$ | 33 nm |
| HC | |

| $SiO_2$ | 138 nm |
|---|---|
| $ZrO_2$ | 63 nm |
| $SiO_2$ | 138 nm |
| $ZrO_2$ | 5 nm |
| $SiO_2$ | 68 nm |
| $ZrO_2$ | 51 nm |
| HC | |

PRIOR ART

| $SiO_2$ | 124 nm |
|---|---|
| $ZrO_2$ | 60 nm |
| $SiO_2$ | 266 nm |
| $ZrO_2$ | 48 nm |
| $SiO_2$ | 55 nm |
| $ZrO_2$ | 34 nm |
| HC | |

| $SiO_2$ | 207 nm |
|---|---|
| $ZrO_2$ | 31 nm |
| $SiO_2$ | 55 nm |
| $ZrO_2$ | 41 nm |
| $SiO_2$ | 118 nm |
| $ZrO_2$ | 46 nm |
| HC | |

| $SiO_2$ | 127 nm |
|---|---|
| $ZrO_2$ | 61 nm |
| $SiO_2$ | 273 nm |
| $ZrO_2$ | 49 nm |
| $SiO_2$ | 57 nm |
| $ZrO_2$ | 37 nm |
| HC | |

| $SiO_2$ | 99 nm |
|---|---|
| $TiO_2$ | 95 nm |
| $SiO_2$ | 201 nm |
| $TiO_2$ | 91 nm |
| $SiO_2$ | 21 nm |
| $TiO_2$ | 21 nm |
| HC | |

| $SiO_2$ | 103 nm |
|---|---|
| $TiO_2$ | 90 nm |
| $SiO_2$ | 216 nm |
| $TiO_2$ | 63 nm |
| $SiO_2$ | 31 nm |
| $TiO_2$ | 27 nm |
| HC | |

FIG.13
FIG.14
Example-7
Rv (%)
30
40
50
60
Incident angle (°)

| $SiO_2$ | 101 nm |
|---|---|
| $TiO_2$ | 94 nm |
| $SiO_2$ | 206 nm |
| $TiO_2$ | 95 nm |
| $SiO_2$ | 23 nm |
| $TiO_2$ | 20 nm |
| HC | |

| $SiO_2$ | 130 nm |
|---|---|
| $HfO_2$ | 48 nm |
| $SiO_2$ | 265 nm |
| $HfO_2$ | 50 nm |
| $SiO_2$ | 49 nm |
| $HfO_2$ | 30 nm |
| HC | |

| $SiO_2$ | 120 nm |
|---|---|
| SiN | 68 nm |
| $SiO_2$ | 270 nm |
| SiN | 47 nm |
| $SiO_2$ | 56 nm |
| SiN | 38 nm |
| HC | |

| $SiO_2$-based | 136 nm |
|---|---|
| $ZrO_2$ | 34 nm |
| $SiO_2$-based | 257 nm |
| $ZrO_2$ | 50 nm |
| $SiO_2$-based | 40 nm |
| $ZrO_2$ | 28 nm |
| HC | |

| Example stacks 1-10 | | |
|---|---|---|
| | ROT | PT (nm) |
| L3 | 0.27 - 0.36 | 99 - 136 |
| H3 | 0.12 - 0.41 | 34 - 95 |
| L2 | 0.54 - 0.74 | 201 - 276 |
| H2 | 0.16 - 0.41 | 46 - 95 |
| L1 | 0.06 - 0.16 | 21 -60 |
| H1 | 0.09 - 0.14 | 20 - 40 |
| L3/L2 | 0.44 - 0.53 | 0.44 - 0.53 |
| L3/H1 | 2.22 - 3.62 | 3.02 - 4.96 |
| L3xH1 | 0.0237 - 0.0480 | 2000-4900 |

FIG.21

| Comparative stacks 1-4 | | |
|---|---|---|
| | ROT | PT (nm) |
| L3 | 0.35 - 0.55 | 129-207 |
| H3 | 0.11 - 0.62 | 31-161 |
| L2 | 0.15 - 0.37 | 54-139 |
| H2 | 0.02 - 0.16 | 5 - 43 |
| L1 | 0.02 - 0.31 | 7 - 118 |
| H1 | 0.17 - 0.37 | 46 - 95 |
| L3/L2 | 1.00 – 3.78 | 1.00-3.78 |
| L3/H1 | 0.94 – 3.30 | 1.37-4.47 |
| L3xH1 | 0.0680 - 0.1333 | 7000 - 13700 |

FIG.22

OPTICAL ARTICLE WITH IMPROVED VISUAL COMFORT

CROSS-REFERENCE TO RELATED APPLICATIONS

This application is a national phase application under 35 U.S.C. § 371 of International Application No. PCT/EP2022/059740 filed 12 Apr. 2022, which claims priority to European Patent Application No. 21305681.5 filed 26 May 2021. The entire contents of each of the above-referenced disclosures is specifically incorporated by reference herein without disclaimer.

FIELD OF THE DISCLOSURE

The present disclosure relates to an optical article with improved visual comfort.

More particularly, the present disclosure relates to an optical article provided with an interferential "mirror" coating that brings improved visual comfort with respect to visible light reflection, while keeping the fashion aspect of the "mirror" coating. In the present disclosure, a coating is referred to as a "mirror" coating if the mean visible light reflection factor Rv of the coating is higher than 2.5%, where the mean visible light reflection factor Rv is defined as follows:

$$R_V = \frac{\int_{380}^{780} R(\lambda) \cdot V(\lambda) \cdot D_{65}(\lambda) \cdot d\lambda}{\int_{380}^{780} V(\lambda) \cdot D_{65}(\lambda) \cdot d\lambda}$$

where R(λ) is the reflectance at a wavelength λ, V(λ) is the eye sensitivity function in the color space defined by the CIE (Commission on Illumination, in French "Commission Internationale de l'Eclairage") in 1931 and $D_{65}(\lambda)$ is the daylight illuminant defined in the CIE S005/E-1998 standard.

By way of non-limiting example, the present disclosure may be applied in the field of sunglasses.

BACKGROUND OF THE DISCLOSURE

Fashionable mirror coatings are widely applied on sunglasses. High forward reflection of visible light, i.e. reflection away from a wearer's eye of visible light hitting the face of the lens of the sunglasses that is on the side of the scene viewed by the wearer, is desirable for mirror coatings.

However, conventional mirror coatings usually exhibit high backward reflection of visible light as well, i.e. reflection of visible light coming from the wearer's side, transmitted through the substrate and then reflected through the mirror coating on the front surface towards the wearer' eyes. Thus, backward reflection of visible light is annoying for the wearer, especially when a mirror with high to very high reflective properties is used.

High backward reflection of visible light at low incident angles, i.e. low angles with respect to a perpendicular to the considered face of the lens, is not a big issue for wearers, because the light coming from the backside will be blocked by the wearer's head.

It is also desirable for the mirror coating to maintain high forward reflection of visible light at low incident angles.

On the other hand, at high incident angles, e.g. 35°-55°, light coming from the backside could be reflected into the wearer's eyes, which is a problem.

EP 3 118 658 discloses an optical article comprising a base material defining a front and a rear main faces, at least one main face being coated with an interferential multilayer coating defining high reflective properties when viewing said article from its front face and antireflective properties when viewing said article from its rear face.

To this end, this document teaches to provide the front face of the optical article with an absorptive asymmetric mirror coating which is composed of one or two absorptive metal layers (Cr, Ta, Nb, Ti or Zr) added in an interferential stack, and its rear face with a conventional antireflective coating transparent to visible light.

The said metal-containing absorptive asymmetric mirror coatings can have a much lower backward reflection as compared to the high forward reflection, which can effectively reduce the light coming from the rear face of the optical article, transmitted through the substrate and then reflected from the mirror coating on the front surface towards the wearer's eyes.

However, because of the very strong light absorption properties of the metal material used, only very thin metal layers having a thickness of a few nanometers shall be used in this optical article to guarantee a minimum of light transmission to the wearer's eyes. However, such low metal layer thickness is difficult or even impossible to obtain, or requires a specific method and/or is not easily controlled.

Therefore, there is an unfulfilled need to improve visual comfort for the wearer by providing an optical article with reduced backward reflection of visible light at high incident angles and high forward reflection of visible light at low incident angles involving conventional manufacturing methods.

SUMMARY OF THE DISCLOSURE

An object of the disclosure is to overcome at least some of the above-mentioned limitations of the prior art.

To that end, the disclosure provides an optical article having a back face on the side of a wearer's eye, a front face opposite to the back face, wherein the optical article has, on at least one of the front and back faces, an interferential multilayer coating comprising a stack of at least one layer of high refractive index material having a refractive index higher than 1.55 and at least one layer of low refractive index material having a refractive index of 1.55 or less, the refractive indexes being expressed for a wavelength of 550 nm, the optical article being designed in such a manner that it has high reflective properties for low incident angles when viewing the article from its front or back face and antireflective properties for high incident angles when viewing the article from its front or back face,

- the mean visible light reflection factor Rv of the coating for visible light hitting the front or back face being lower than or equal to 2.5% at an angle of incidence with respect to a perpendicular to the front or back face that is higher than or equal to 35° and lower than or equal to 55°; and
- the mean visible light reflection factor Rv of the coating for visible light hitting the front or back face being higher than or equal to 2.5% at an angle of incidence with respect to a perpendicular to the front or back face that is higher than or equal to 0° and lower than or equal to 15°.

Thus, the optical article offers low backward reflection, at high incident angles, of visible light that may reach the wearer's eyes. This consequently improves the wearer's visual comfort while keeping the fashion aspect of the mirror coating.

In particular embodiments, the mean visible light reflection factor Rv is lower than or equal to 2%, more preferably lower than or equal to 1.5% when the angle of incidence is higher than or equal to 35° and lower than or equal to 50°.

In particular embodiments, the mean visible light reflection factor Rv is higher than or equal to 3.5% when the angle of incidence is higher than or equal to 0° and lower than or equal to 10°.

In particular embodiments, the ratio between Rv(0°), the Rv value at an angle of incidence perpendicular to the front or back face and Rvmin(35°-50°), the minimum Rv value at an angle of incidence with respect to a perpendicular to the front or back surface that is higher than or equal to 35° and lower than or equal to 50°, is higher than 3, preferably higher than 4, more preferably higher than 5.

In particular embodiments, the ratio between Rv(10°), the Rv value at an angle of incidence with respect to a perpendicular to the front or back face that is equal to 10° and Rvmin(35°-50°), the minimum Rv value at an angle of incidence with respect to a perpendicular to the front or back surface that is higher than or equal to 35° and lower than or equal to 50°, is higher than 3, preferably higher than 4, more preferably higher than 5.

In particular embodiments, the coating comprises alternating layers of a high refractive index material and a low refractive index material.

In the present disclosure, a "high refractive index" or "HI" material or layer, is a material or layer having typically a refractive index above or equal to 1.5 and a "low refractive index" or "LI" material or layer, is a material having typically a refractive index below 1.5.

In particular embodiments, the above-mentioned alternating layers comprise, from an innermost layer to an outermost layer:

- a first high refractive index material layer H1, having a physical thickness ranging from 15 to 50 nm and a relative optical thickness ranging from 0.05 to 0.20, the relative optical thickness being defined as $ROT=PT\times n_{550}/550$, where PT is the physical thickness and $n_{550}$ is the refractive index at 550 nm;
- a first low refractive index material layer L1, having a physical thickness ranging from 0 to 80 nm and a relative optical thickness ranging from 0.04 to 0.20;
- a second high refractive index material layer H2, having a physical thickness ranging from 40 nm to 100 nm and a relative optical thickness ranging from 0.10 to 0.50;
- a second low refractive index material layer L2, having a physical thickness ranging from 180 nm to 300 nm and a relative optical thickness ranging from 0.40 to 0.90;
- a third high refractive index material layer H3, having a physical thickness ranging from 50 nm to 120 nm and a relative optical thickness ranging from 0.15 to 0.50;
- a third low refractive index material layer L3, having a physical thickness ranging from 80 nm to 150 nm and a relative optical thickness ranging from 0.20 to 0.40.

In particular embodiments:

- the physical thickness ratio between the third low refractive index material layer L3 and the second low refractive index material layer L2 is lower than 0.5 and the relative optical thickness ratio between the third low refractive index material layer L3 and the second low refractive index material layer L2 is lower than 0.5;
- the physical thickness ratio between the third low refractive index material layer L3 and the first high refractive index material layer H1 is higher than 3 and the relative optical thickness ratio between the third low refractive index material layer L3 and the first high refractive index material layer H1 is higher than 2.2;
- the product of the physical thickness of the third low refractive index material layer L3 and the first high refractive index material layer H1 is lower than 5000 and the product of the relative optical thickness of the third low refractive index material layer L3 and the first high refractive index material layer H1 is lower than 0.05.

In particular embodiments, the above-mentioned high refractive index material is SiN, $TiO_2$, $PrTiO_3$, $LaTiO_3$, $ZrO_2$, $Ta_2O_5$, $Y_2O_3$, $Ce_2O_3$, $La_2O_3$, $Dy_2O_5$, $Nb_2O_5$, $HfO_2$, $Sc_2O_3$, $Pr_2O_3$, $Al_2O_3$, or $Si_3N_4$ and the above-mentioned low refractive index material is $SiO_2$, $MgF_2$, $ZrF_4$, $Al_2O_3$, $AlF_3$, chiolite $Na_3[Al_3F_{14}]$, cryolite $Na_3[AlF_6]$, or any mixture thereof, preferably $SiO_2$ or $SiO_2$ doped with $Al_2O_3$ with from 1 to 10% by weight, more preferably from 1 to 8% by weight of $Al_2O_3$ relative to the total weight of $SiO_2$ and $Al_2O_3$ in the low refractive index material layer.

In such particular embodiments, the high refractive index material may be $ZrO_2$, $Ta_2O_5$, $Nb_2O_5$, SiN or $TiO_2$ and the low refractive index material may be $SiO_2$ or $SiO_2$ doped with $Al_2O_3$ with from 1 to 10% by weight, more preferably from 1 to 8% by weight of $Al_2O_3$ relative to the total weight of $SiO_2$ and $Al_2O_3$ in the low refractive index material layer.

In such particular embodiments, the coating may comprise alternating layers of a high refractive index material and a low refractive index material, the alternating layers comprising, from an innermost layer to an outermost layer:

- a layer of $ZrO_2$, $Ta_2O_5$, $Nb_2O_5$, SiN or $TiO_2$ having a thickness of 20-40 nm;
- a layer of $SiO_2$ or $SiO_2$ doped with $Al_2O_3$ with from 1 to 10% by weight, more preferably from 1 to 8% by weight of $Al_2O_3$ relative to the total weight of $SiO_2$ and $Al_2O_3$ in the low refractive index material layer having a thickness of 10-80 nm;
- a layer of $ZrO_2$, $Ta_2O_5$, $Nb_2O_5$, SiN or $TiO_2$ having a thickness of 46-95 nm;
- a layer of $SiO_2$ or $SiO_2$ doped with $Al_2O_3$ with from 1 to 10% by weight, more preferably from 1 to 8% by weight of $Al_2O_3$ relative to the total weight of $SiO_2$ and $Al_2O_3$ in the low refractive index material layer having a thickness of 180-300 nm;
- a layer of $ZrO_2$, $Ta_2O_5$, $Nb_2O_5$, SiN or $TiO_2$ having a thickness of 50-120 nm;
- a layer of $SiO_2$ or $SiO_2$ doped with $Al_2O_3$ with from 1 to 10% by weight, more preferably from 1 to 8% by weight of $Al_2O_3$ relative to the total weight of $SiO_2$ and $Al_2O_3$ in the low refractive index material layer having a thickness of 80-150 nm.

In particular embodiments, the optical article may be an ophthalmic lens, a device having a safety wall intended to face the wearer's eye, an optical filter, or an optical film or patch intended to be fixed on a substrate.

The present disclosure also provides sunglasses, wherein those sunglasses comprise at least one optical article as succinctly described above.

As the sunglasses according to the present disclosure have the same particular features and advantages as the optical article, they are not repeated here.

BRIEF DESCRIPTION OF THE DRAWINGS

For a more complete understanding of the description provided herein and the advantages thereof, reference is now made to the brief descriptions below, taken in connection with the accompanying drawings and detailed description, wherein like reference numerals represent like parts.

FIG. 21 is a chart gathering, for all the non-limiting examples, the ranges of values of the relative optical thickness and of the physical thickness of the layers, as well as ratios and products thereof for some layers.

FIG. 22 is a chart gathering, for all the comparative examples, the ranges of values of the relative optical thickness and of the physical thickness of the layers, as well as ratios and products thereof for some layers.

DETAILED DESCRIPTION OF THE DISCLOSURE

Figures 1, 2:
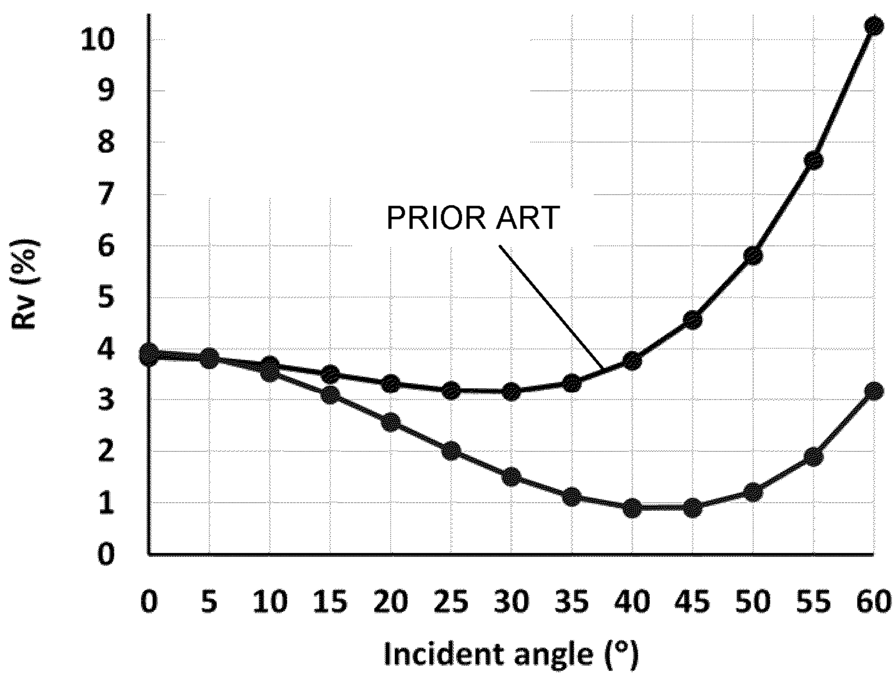
FIG. 1 is a schematic view showing the layer structure of a first comparative example of a mirror coating in an optical article according to the prior art and a first non-limiting example of a mirror coating in an optical article according to the present disclosure.
FIG. 2 is a graph showing the variation of the mean visible light reflection factor Rv as a function of the incident angle for the first comparative example according to the prior art and for the first non-limiting example according to the present disclosure.

In the description which follows, the drawing figures are not necessarily to scale and certain features may be shown in generalized or schematic form in the interest of clarity and conciseness or for informational purposes. In addition, although making and using various embodiments are discussed in detail below, it should be appreciated that as described herein are provided many inventive concepts that may embodied in a wide variety of contexts. Embodiments discussed herein are merely representative and do not limit the scope of the disclosure. It will also be obvious to one skilled in the art that all the technical features that are defined relative to a process can be transposed, individually or in combination, to a device and conversely, all the technical features relative to a device can be transposed, individually or in combination, to a process and the technical features of the different embodiments may be exchanged or combined with the features of other embodiments.

The terms “comprise” (and any grammatical variation thereof, such as “comprises” and “comprising”), “have” (and any grammatical variation thereof, such as “has” and “having”), “contain” (and any grammatical variation thereof, such as “contains” and “containing”), and “include” (and any grammatical variation thereof such as “includes” and “including”) are open-ended linking verbs. They are used to specify the presence of stated features, integers, steps or components or groups thereof, but do not preclude the presence or addition of one or more other features, integers, steps or components or groups thereof. As a result, a method, or a step in a method, that “comprises”, “has”, “contains”, or “includes” one or more steps or elements possesses those one or more steps or elements, but is not limited to possessing only those one or more steps or elements.

Unless otherwise indicated, all numbers or expressions referring to quantities of ingredients, ranges, reaction conditions, etc. used herein are to be understood as modified in all instances by the term “about”.

Also unless otherwise indicated, the indication of an interval of values "from X to Y" or "between X and Y", according to the present disclosure, means including the values of X and Y.

In the present disclosure, when an optical article comprises one or more coatings on its surface, the expression "to deposit a layer or a coating onto the article" is intended to mean that a layer or a coating is deposited onto the external (exposed) surface of the outer coating of the article, that is to say its coating that is the most distant from the substrate.

A coating that is said to be "on" a substrate or deposited "onto" a substrate is defined as a coating which (i) is positioned above the substrate, (ii) is not necessarily in contact with the substrate, that is to say one or more intermediate coatings may be arranged between the substrate and the coating in question, and (iii) does not necessarily completely cover the substrate.

In a particular embodiment, the coating on a substrate or deposited onto a substrate is in direct contact with the substrate.

As used herein, the "back" or "rear" or "inner" face of an optical article is intended to mean the face which, when using the optical article, is the nearest from the wearer's eye. Such back or rear or inner face is generally concave. On the contrary, the front face of the substrate is the face which, when using the optical article, is the most distant from the wearer's eye. It is generally convex.

In addition, the "angle of incidence (symbol θ)" is the angle formed by a ray light incident on an ophthalmic lens surface and a normal to the surface at the point of incidence. The ray light is for instance an illuminant light source, such as the standard illuminant D65 as defined in the international colorimetric CIE L*a*b*. Generally the angle of incidence changes from 0° (normal incidence) to 90° (grazing incidence). The usual range for angle of incidence is from 0° to 75°.

The colorimetric coefficients of the optical article of the disclosure in the international colorimetric system CIE L*a*b* are calculated between 380 nm and 780 nm, taking the standard illuminant D65 and the observer into account (angle of) 10°. The observer is a "standard observer" as defined in the international colorimetric system CIE L*a*b*.

The expression "natural light" or "visible light" includes any type of natural light, especially daylight or sunlight. Sunlight has a bright emission in the whole visible spectrum, especially in the 550 nm-620 nm wavelength range. In some embodiments, the expression "natural light" or "visible light" also includes artificial light having a large spectrum, such as light emitted by some LED devices that mimic the sun.

In the present invention, the terms "absorbing" and "absorption" of a device in a wavelength range refer to a case where the mean emission value of the device in the wavelength range is lower than 50% of the mean emission value of the device in each of the adjacent 40 nm wavelength ranges.

Generally speaking, the interferential coatings of the optical article according to the disclosure, which will be referred to as "the reflective (or mirror) coating", depending on the configuration described, may be deposited onto any substrate, and preferably onto organic lens substrates, for example a thermoplastic or thermosetting plastic material. Thermoplastic may be selected from, for instance: polyamides; polyimide; polysulfones; polycarbonates and copolymers thereof; poly(ethylene terephthalate) and polymethylmethacrylate (PMMA).

Thermoset materials may be selected from, for instance: cycloolefin copolymers such as ethylene/norbornene or ethylene/cyclopentadiene copolymers; homo- and copolymers of allyl carbonates of linear or branched aliphatic or aromatic polyols, such as homopolymers of diethylene glycol bis(allyl carbonate) (CR 39®); homo- and copolymers of (meth)acrylic acid and esters thereof, which may be derived from bisphenol A; polymer and copolymer of thio(meth) acrylic acid and esters thereof, polymer and copolymer of allyl esters which may be derived from bisphenol A or phtalic acids and allyl aromatics such as styrene, polymer and copolymer of urethane and thiourethane, polymer and copolymer of epoxy, and polymer and copolymer of sulphide, disulfide and episulfide, and combinations thereof.

As used herein, a (co)polymer is intended to mean a copolymer or a polymer. As used herein, a (meth)acrylate is intended to mean an acrylate or a methacrylate. As used herein, a polycarbonate (PC) is intended to mean either homopolycarbonates or copolycarbonates and block copolycarbonates.

Homopolymers of diethylene glycol bis(allyl carbonate) (CR39®), allylic and (meth)acrylic copolymers, having a refractive index between 1.54 and 1.58, polymer and copolymer of thiourethane, polycarbonates are preferred.

The substrate may be coated with one or more functional coatings prior to depositing the antireflective or mirror coating of the disclosure. These functional coatings traditionally used in optics may be, without limitation, an impact-resistant primer layer, an abrasion-resistant coating and/or a scratch-resistant coating, a polarizing coating, a photochromic coating or a tinted coating. In the following, a substrate means either a bare substrate or such a coated substrate.

Prior to depositing the mirror coating, the surface of said substrate is usually submitted to a physical or chemical surface activating treatment, so as to reinforce the adhesion of the antireflective or mirror coating. Such pre-treatment is generally conducted under vacuum. It may be a bombardment with energetic and/or reactive species, for example with an ion beam ("Ion Pre-Cleaning" or "IPC") or with an electron beam, a corona discharge treatment, an ion spallation treatment, an ultraviolet treatment or a plasma-mediated treatment under vacuum, generally using an oxygen or an argon plasma. It may also be an acid or basic treatment and/or a solvent-based treatment (water, hydrogen peroxide or any organic solvent).

An optical article according to the disclosure comprises at least one ophthalmic lens or optical filter or optical glass or optical material suitable for human vision, e.g. at least one ophthalmic lens, or optical filter, or optical film or patch intended to be fixed on a substrate, or optical glass, or optical material intended for use in an ophthalmic instrument, for example for determining the visual acuity and/or the refraction of a subject, or any kind of safety device including a safety glass or safety wall intended to face an individual's eye, such as a protective device, for instance safety lenses or a mask or shield.

The optical article may be implemented as eyewear equipment having a frame that surrounds at least partially one or more ophthalmic lenses. By way of non-limiting example, the optical article may be a pair of glasses, sunglasses, safety goggles, sports goggles, a contact lens, an intraocular implant, an active lens with an amplitude modulation such as a polarized lens, or with a phase modulation such as an auto-focus lens, etc.

The at least one ophthalmic lens or optical glass or optical material suitable for human vision can provide an optical function to the user i.e. the wearer of the lens.

It can for instance be a corrective lens, namely, a power lens of the spherical, cylindrical and/or addition type for an ametropic user, for treating myopia, hypermetropia, astigmatism and/or presbyopia. The lens can have a constant power, so that it provides power as a single vision lens would do, or it can be a progressive lens having variable power.

The optical article according to the disclosure has a back face on the side of a wearer's eye and a front face opposite to the back face. In addition, the optical article has, on the front face or on the back face or on both faces, an interferential multilayer coating comprising a stack of at least one layer of high refractive index material having a refractive index higher than 1.55 and at least one layer of low refractive index material having a refractive index of 1.55 or less, the refractive indexes being expressed for a wavelength of 550 nm.

The optical article is designed in such a manner that it has high reflective properties, also referred to as mirror coating, for low incident angles when viewing the article from its front or back face and antireflective properties for high incident angles when viewing the article from its front or back face, According to the present disclosure:

- the mean visible light reflection factor Rv, as defined in the introductory part of the description, of said coating for visible light hitting the front or back face of the optical article, is lower than or equal to 2.5% at an angle of incidence with respect to a perpendicular to the front or back face of the optical article that is higher than or equal to 35° and lower than or equal to 55° and is even lower than or equal to 2%, more preferably lower than or equal to 1.5% when the angle of incidence is higher than or equal to 35° and lower than 50°; and
- the mean visible light reflection factor Rv of the coating for visible light hitting the front face of the optical article, is higher than or equal to 2.5% at an angle of incidence with respect to a perpendicular to the front or back face of the optical article that is higher than or equal to 0° and lower than or equal to 15° and is even higher than or equal to 3.5% at an angle of incidence with respect to a perpendicular to the front or back face of the optical article that is higher than or equal to 0° and lower than or equal to 10°.

In a particular embodiment of the disclosure, the ratio between Rv(0°), the Rv value at an angle of incidence perpendicular to the front or back face and Rvmin(35°-50°), the minimum Rv value at an angle of incidence with respect to a perpendicular to the front or back surface that is higher than or equal to 35° and lower than or equal to 50°, is higher than 3, preferably higher than 4, more preferably higher than 5.

In a particular embodiment of the disclosure, the ratio between Rv(10°), the Rv value at an angle of incidence with respect to a perpendicular to said front or back face that is equal to 10° and Rvmin(35°-50°), the minimum Rv value at an angle of incidence with respect to a perpendicular to said front or back surface that is higher than or equal to 35° and lower than or equal to 50°, is higher than 3, preferably higher than 4, more preferably higher than 5.

In a particular embodiment of the disclosure, the proposed mirror coating comprises alternating layers of a high refractive index or "HI" material (having typically a refractive index above or equal to 1.5) and a low refractive index or "LI" material (having typically a refractive index lower than 1.5).

The mirror coating may be coated directly onto a base material or substrate. Alternatively, at least one layer may be present between the base material and the mirror coating, such as a hard coat layer.

The HI and LI alternating layers may comprise, from an innermost layer to an outermost layer:

- a first high refractive index material layer H1, having a physical thickness ranging from 15 to 50 nm and a relative optical thickness ranging from 0.05 to 0.20, the relative optical thickness being defined as $ROT=PT\times n_{550}/550$, where PT is the physical thickness and $n_{550}$ is the refractive index at 550 nm;
- a first low refractive index material layer L1, having a physical thickness ranging from 0 to 80 nm and a relative optical thickness ranging from 0.04 to 0.20;
- a second high refractive index material layer H2, having a physical thickness ranging from 40 nm to 100 nm and a relative optical thickness ranging from 0.10 to 0.50;
- a second low refractive index material layer L2, having a physical thickness ranging from 180 nm to 300 nm and a relative optical thickness ranging from 0.40 to 0.90;
- a third high refractive index material layer H3, having a physical thickness ranging from 50 nm to 120 nm and a relative optical thickness ranging from 0.15 to 0.50; and
- a third low refractive index material layer L3, having a physical thickness ranging from 80 nm to 150 nm and a relative optical thickness ranging from 0.20 to 0.40.

Moreover, in the above embodiment:

- the physical thickness ratio between L3 and L2 is lower than 0.5 and the relative optical thickness ratio between L3 and L2 is lower than 0.5;
- the physical thickness ratio between L3 and H1 is higher than 3 and the relative optical thickness ratio between L3 and H1 is higher than 2.2;
- the product of the physical thickness of L3 and H1 is lower than 5000 and the product of the relative optical thickness of L3 and H1 is lower than 0.05.

FIG. 1 shows, on the left, the layer structure of a first comparative example of a prior art mirror coating and on the right, the structure of a first non-limiting example of a mirror coating with low backward reflection and high forward reflection, coating a face of an optical article according to the present disclosure. The left column of the two layer structures gives the material of the considered layer and the right column gives its physical thickness.

The two mirror coatings shown in FIG. 1 are composed of alternating $Ta_2O_5$ (HI material) and $SiO_2$ (LI material) layers, composing a stack arranged on a hard coat ("HC") layer.

Table 1 below gives the optical properties of the mirror coatings h*, C* and Rv for backward reflection, at a normal incidence angle of light i.e. light hitting the considered face of the optical article perpendicularly to that face, which is summarized in Table 1 with the expression "@0°".

TABLE 1

| | h*@0° | C*@0° | Rv@0° (%) |
|---|---|---|---|
| Comparative prior art example 1 | 295 | 69 | 3.84 |
| Example 1 according to the disclosure | 286 | 74 | 3.93 |

The graph of FIG. 2 shows two curves giving the respective variation of Rv for the two mirror coatings of FIG. 1 at different incident angles θ. For the prior art mirror coating, Rv changes slightly between 3 and 4% when θ≤40°. At θ>40°, Rv increases rapidly.

By contrast, for the mirror coating according to the present disclosure, only Rv n at low incident angles (θ≤10° is comparable to Rv of the prior art mirror coating. In the incident angle range 25°≤θ≤55°, Rv for the mirror coating according to the present disclosure is always lower than or equal to 2%.

In the range 35°≤θ≤50°, Rv for the mirror coating according to the present disclosure is even about 1% or lower.

This feature of the proposed mirror coating is effective to minimize the back-reflection light which can potentially reach the wearer's eyes.

Figures 3, 4:
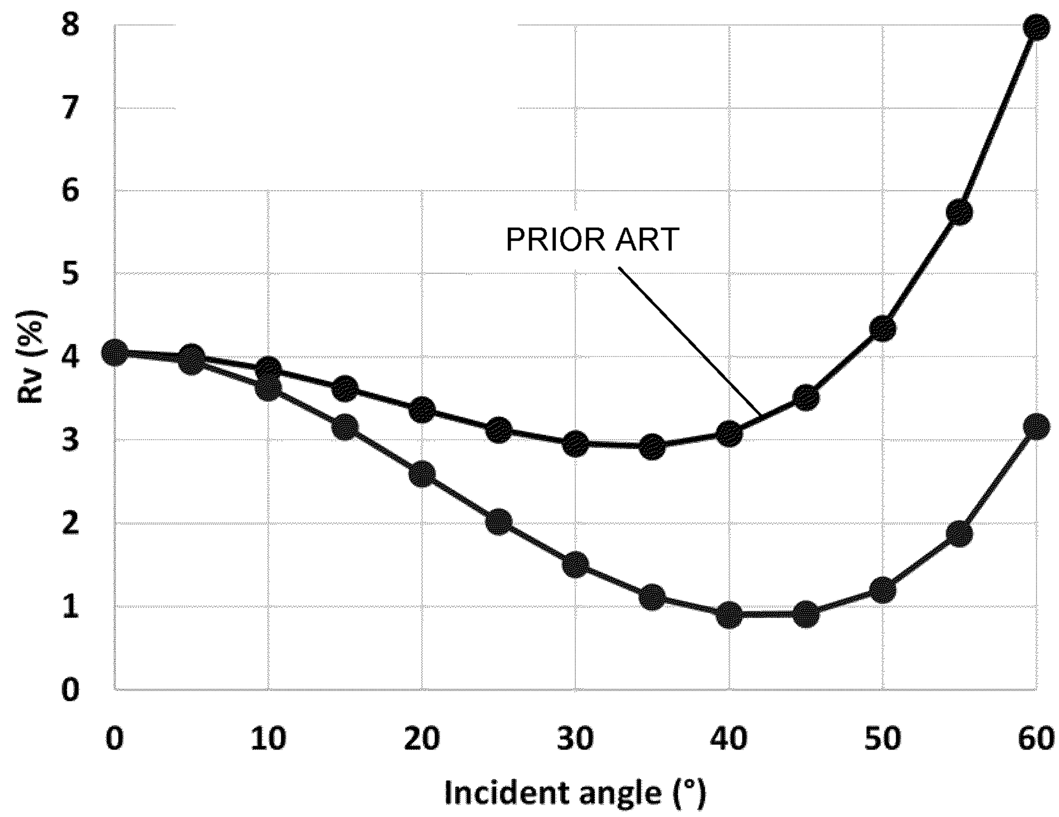
FIG. 3 is a schematic view showing the layer structure of a second comparative example of a mirror coating in an optical article according to the prior art and a second non-limiting example of a mirror coating in an optical article according to the present disclosure.
FIG. 4 is a graph showing the variation of the mean visible light reflection factor Rv as a function of the incident angle for the second comparative example according to the prior art and for the second non-limiting example according to the present disclosure.

FIG. 3 shows, on the left, the layer structure of a second comparative example of a prior art mirror coating and on the right, the structure of a second non-limiting example of a mirror coating with low reflection at high incident angles and high reflection at low incident angles, coating a face of an optical article according to the present disclosure. As in FIG. 1, the left column of the two layer structures gives the material of the considered layer and the right column gives its physical thickness.

The two mirror coatings shown in FIG. 3 are composed of alternating $ZrO_2$ (HI material) and $SiO_2$ (LI material) layers, composing a stack arranged on a hard coat ("HC") layer.

The graph of FIG. 4 shows two curves giving the respective variation of Rv for the two mirror coatings of FIG. 3 at different incident angles θ.

As shown in FIG. 4, the optical properties of the mirror coatings of FIG. 3 are similar to those of the first example of FIGS. 1 and 2. Namely, for the prior art mirror coating, Rv changes slightly between 2.9 and 4% when θ≤40°. At θ>40°, Rv increases rapidly. By contrast, for the mirror coating according to the present disclosure, only Rv at low incident angles (θ≤10° is comparable to Rv of the prior art mirror coating. In the incident angle range 25°≤θ≤55°, Rv for the mirror coating according to the present disclosure is always lower than or equal to 2%. In the range 35°≤θ≤50°, Rv for the mirror coating according to the present disclosure is even about 1% or lower.

Similar mirror coatings may also be designed using other kinds of optical materials.

HI layers may comprise, without limitation, one or more mineral oxides such as SiN, $TiO_2$, $PrTiO_3$, $LaTiO_3$, $ZrO_2$, $Ta_2O_5$, $Y_2O_3$, $Ce_2O_3$, $La_2O_3$, $Dy_2O_5$, $Nb_2O_5$, $HfO_2$, $Sc_2O_3$, $Pr_2O_3$, $Al_2O_3$, or $Si_3N_4$.

Among the materials suitable for the LI layer can be cited for instance, without limitation, $SiO_2$, $MgF_2$, $ZrF_4$, $Al_2O_3$, $AlF_3$, chiolite ($Na_3[Al_3F_{14}]$), cryolite ($Na_3[AlF_6]$), or any mixture thereof, preferably $SiO_2$ or $SiO_2$ doped with $Al_2O_3$ which contributes to raising the critical temperature of the stack. When $SiO_2/Al_2O_3$ mixtures are used, the LI layer preferably contains from 1 to 10% by weight, more preferably from 1 to 8% by weight of $Al_2O_3$ relative to the total weight of $SiO_2$+$Al_2O_3$ in said LI layer.

In preferred embodiments, the HI material is $ZrO_2$, $Ta_2O_5$, $Nb_2O_5$, SiN or $TiO_2$ and the LI material is $SiO_2$ or $SiO_2$ doped with $Al_2O_3$ with from 1 to 10% by weight, more preferably from 1 to 8% by weight of $Al_2O_3$ relative to the total weight of $SiO_2$+$Al_2O_3$ in said LI layer.

In such embodiments, the coating may comprise alternating layers of a HI material and an LI index material, the alternating layers comprising, from an innermost layer to an outermost layer:

- a layer of $ZrO_2$, $Ta_2O_5$, $Nb_2O_5$, SiN or $TiO_2$ having a thickness of 20-40 nm;
- a layer of $SiO_2$ or $SiO_2$ doped with $Al_2O_3$ with from 1 to 10% by weight, more preferably from 1 to 8% by weight of $Al_2O_3$ relative to the total weight of $SiO_2$ and $Al_2O_3$ in said LI layer having a thickness of 10-80 nm;
- a layer of $ZrO_2$, $Ta_2O_5$, $Nb_2O_5$, SiN or $TiO_2$ having a thickness of 46-95 nm;
- a layer of $SiO_2$ or $SiO_2$ doped with $Al_2O_3$ with from 1 to 10% by weight, more preferably from 1 to 8% by weight of $Al_2O_3$ relative to the total weight of $SiO_2$ and $Al_2O_3$ in said LI layer having a thickness of 180-300 nm;
- a layer of $ZrO_2$, $Ta_2O_5$, $Nb_2O_5$, SiN or $TiO_2$ having a thickness of 50-120 nm;
- a layer of $SiO_2$ or $SiO_2$ doped with $Al_2O_3$ with from 1 to 10% by weight, more preferably from 1 to 8% by weight of $Al_2O_3$ relative to the total weight of $SiO_2$ and $Al_2O_3$ in said LI layer having a thickness of 80-150 nm.

Figures 5, 6:
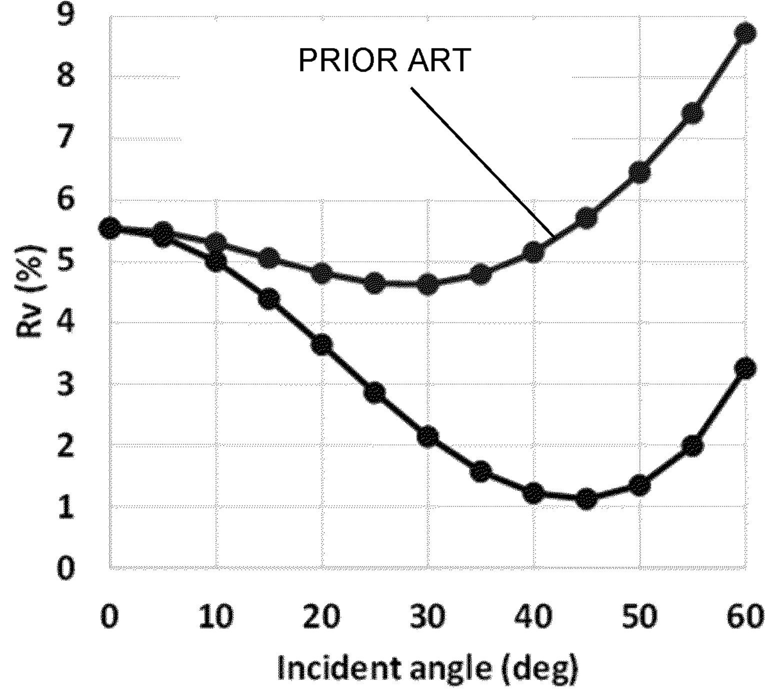
FIG. 5 is a schematic view showing the layer structure of a third comparative example of a mirror coating in an optical article according to the prior art and a third non-limiting example of a mirror coating in an optical article according to the present disclosure.
FIG. 6 is a graph showing the variation of the mean visible light reflection factor Rv as a function of the incident angle for the third comparative example according to the prior art and for the third non-limiting example according to the present disclosure.

FIG. 5 shows, on the left, the layer structure of a third comparative example of a prior art mirror coating and on the right, the structure of a third non-limiting example of a mirror coating with low reflection at high incident angles and high reflection at low incident angles, coating a face of an optical article according to the present disclosure. As in FIG. 1, the left column of the two layer structures gives the material of the considered layer and the right column gives its physical thickness.

As in the second example, the two mirror coatings shown in FIG. 5 are composed of alternating $ZrO_2$ (HI material) and $SiO_2$ (LI material) layers, composing a stack arranged on a hard coat ("HC") layer.

The graph of FIG. 6 shows two curves giving the respective variation of Rv for the two mirror coatings of FIG. 5 at different incident angles θ.

As shown in FIG. 6, in comparison with the previous two examples, Rv at low incident angles for the third example is higher, about 5.5% at 0°, both for the prior art mirror coating and for the mirror coating according to the present disclosure.

For the prior art mirror coating, Rv changes slightly between 4.6 and 5.5% when θ≤30°. At θ≥35°, Rv increases rapidly. By contrast, for the mirror coating according to the present disclosure, only Rv at low incident angles (θ≤10° is comparable to Rv of the prior art mirror coating. In the incident angle range 35°≤θ≤55°, Rv for the mirror coating according to the present disclosure is always lower than or equal to 2%. In the range 35°≤θ≤50°, Rv for the mirror coating according to the present disclosure is even about 1.5% or lower. In comparison with the second example, when Rv@0° increases from 4% to 5.5%, the minimum Rv at high incident angles increases slightly from 0.09% to 1.12%.

Figures 7, 8:
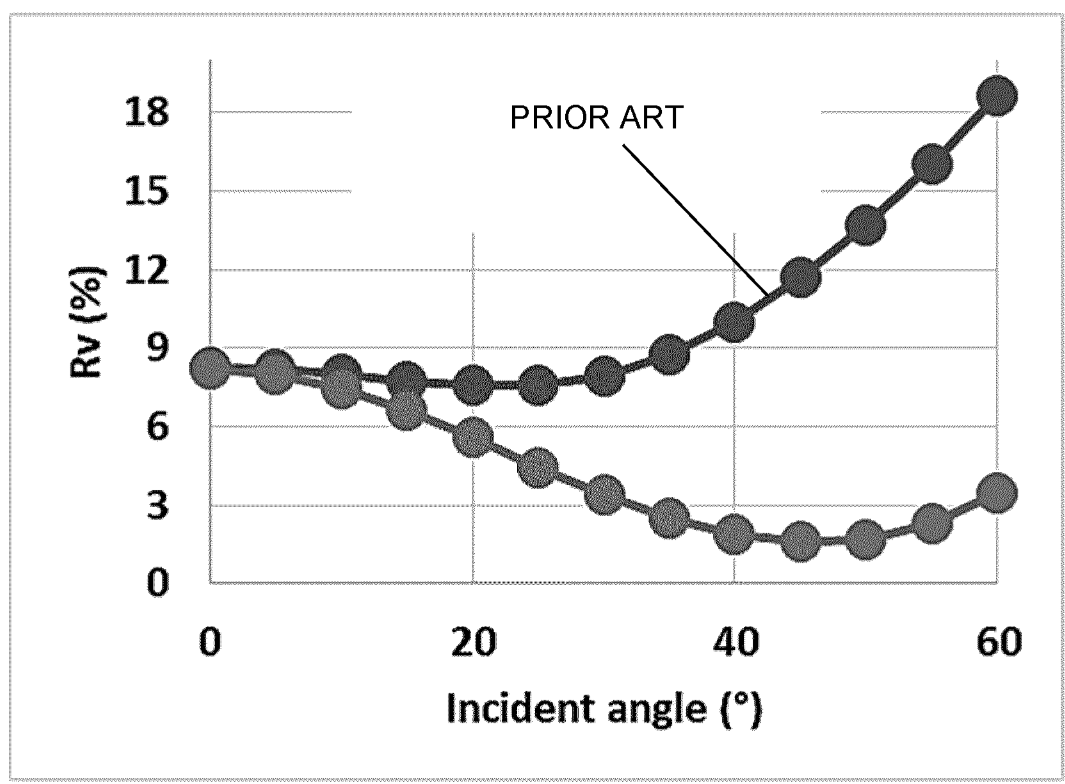
FIG. 7 is a schematic view showing the layer structure of a fourth comparative example of a mirror coating in an optical article according to the prior art and a fourth non-limiting example of a mirror coating in an optical article according to the present disclosure.
FIG. 8 is a graph showing the variation of the mean visible light reflection factor Rv as a function of the incident angle for the fourth comparative example according to the prior art and for the fourth non-limiting example according to the present disclosure.

FIG. 7 shows, on the left, the layer structure of a fourth comparative example of a prior art mirror coating and on the right, the structure of a fourth non-limiting example of a mirror coating with low reflection at high incident angles and high reflection at low incident angles, coating a face of an optical article according to the present disclosure. As in FIG. 1, the left column of the two layer structures gives the material of the considered layer and the right column gives its physical thickness.

As in the second example, the two mirror coatings shown in FIG. 5 are composed of alternating $ZrO_2$ (HI material) and $SiO_2$ (LI material) layers, composing a stack arranged on a hard coat ("HC") layer.

The graph of FIG. 8 shows two curves giving the respective variation of Rv for the two mirror coatings of FIG. 7 at different incident angles θ.

As shown in FIG. 8, in comparison with the previous three examples, Rv at low incident angles for the fourth example is higher, about 8% at 0°, both for the prior art mirror coating and for the mirror coating according to the present disclosure.

For the prior art mirror coating, Rv changes slightly between 7.9 and 8.2% when θ≤30°. At θ>35°, Rv increases rapidly. By contrast, for the mirror coating according to the present disclosure, only Rv at low incident angles (θ≤10° is comparable to Rv of the prior art mirror coating. In the incident angle range 35°≤θ≤55°, Rv for the mirror coating according to the present disclosure is always lower than or equal to 2.5%. In the range 40°≤θ≤50°, Rv for the mirror coating according to the present disclosure is even lower than 1.9%.

Figures 9, 10:
FIG. 9 is a schematic view showing the layer structure of a fifth non-limiting example of a mirror coating in an optical article according to the present disclosure.
FIG. 10 is a graph showing the variation of the mean visible light reflection factor Rv as a function of the incident angle for the fifth non-limiting example according to the present disclosure.

FIG. 9 shows the structure of a fifth non-limiting example of a mirror coating with low reflection at high incident angles and high reflection at low incident angles, coating a face of an optical article according to the present disclosure. As in FIG. 1, the left column of the layer structure gives the material of the considered layer and the right column gives its physical thickness.

The mirror coating shown in FIG. 9 is composed of alternating $TiO_2$ (HI material) and $SiO_2$ (LI material) layers, composing a stack arranged on a hard coat ("HC") layer.

The graph of FIG. 10 shows a curve giving the variation of Rv for the mirror coating of FIG. 9 at different incident angles θ.

As shown in FIG. 10, Rv at low incident angles for the fifth example is higher, about 4.5% at 0°.

In the incident angle range 35°≤θ≤55°, Rv for the mirror coating according to the present disclosure is always lower than or equal to 2.5%. In the range 35°≤θ≤50°, Rv for the mirror coating according to the present disclosure is even about 1.5% or lower.

Figures 11, 12:
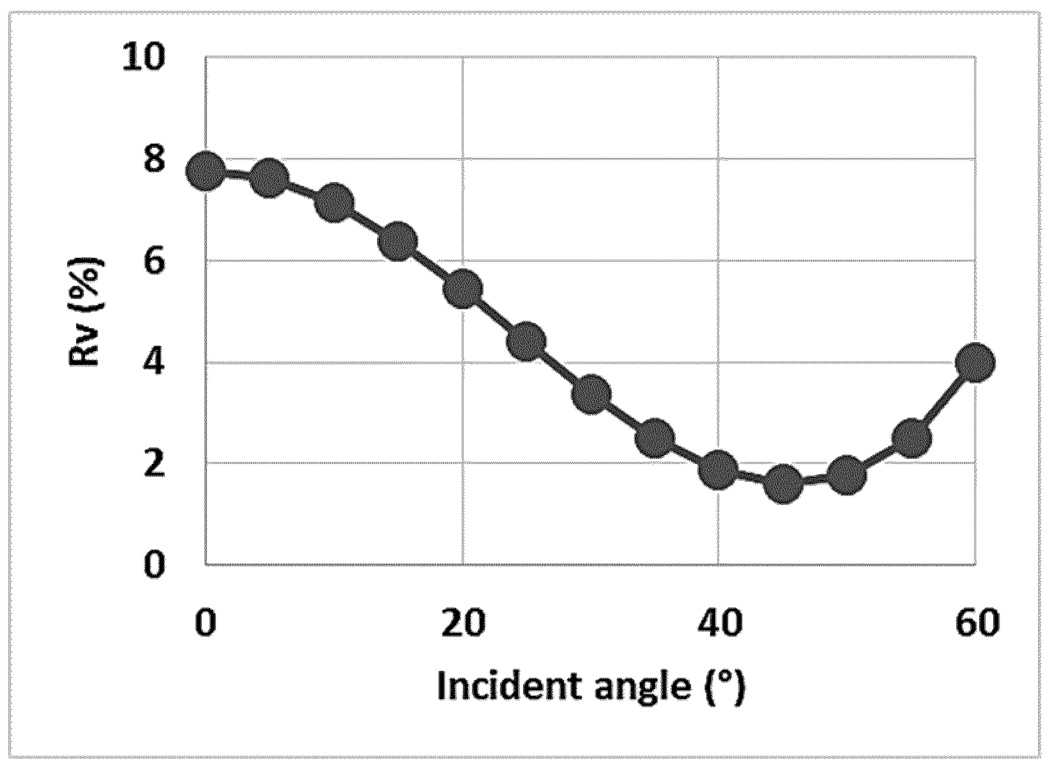
FIG. 11 is a schematic view showing the layer structure of a sixth non-limiting example of a mirror coating in an optical article according to the present disclosure.
FIG. 12 is a graph showing the variation of the mean visible light reflection factor Rv as a function of the incident angle for the sixth non-limiting example according to the present disclosure.

FIG. 11 shows the structure of a sixth non-limiting example of a mirror coating with low reflection at high incident angles and high reflection at low incident angles, coating a face of an optical article according to the present disclosure. As in FIG. 1, the left column of the layer structure gives the material of the considered layer and the right column gives its physical thickness.

The mirror coating shown in FIG. 11 is composed of alternating $TiO_2$ (HI material) and $SiO_2$ (LI material) layers, composing a stack arranged on a hard coat ("HC") layer.

The graph of FIG. 12 shows a curve giving the variation of Rv for the mirror coating of FIG. 11 at different incident angles θ.

As shown in FIG. 12, Rv at low incident angles for the sixth example is higher, about 8% at 0°.

In the incident angle range 35°≤θ≤55°, Rv for the mirror coating according to the present disclosure is always lower than or equal to 2.5%.

Figures 13, 14:
FIG. 13 is a schematic view showing the layer structure of a seventh non-limiting example of a mirror coating in an optical article according to the present disclosure.
FIG. 14 is a graph showing the variation of the mean visible light reflection factor Rv as a function of the incident angle for the seventh non-limiting example according to the present disclosure.

FIG. 13 shows the structure of a seventh non-limiting example of a mirror coating with low reflection at high incident angles and high reflection at low incident angles, coating a face of an optical article according to the present disclosure. As in FIG. 1, the left column of the layer structure gives the material of the considered layer and the right column gives its physical thickness.

The mirror coating shown in FIG. 13 is composed of alternating $TiO_2$ (HI material) and $SiO_2$ (LI material) layers, composing a stack arranged on a hard coat ("HC") layer.

The graph of FIG. 14 shows a curve giving the variation of Rv for the mirror coating of FIG. 13 at different incident angles θ.

As shown in FIG. 14, Rv at low incident angles for the seventh example is higher, about 6% at 0°.

In the incident angle range 35°≤θ≤55°, Rv for the mirror coating according to the present disclosure is always lower than or equal to 2.5%. In the range 35°≤θ≤50°, Rv for the mirror coating according to the present disclosure is even about 1.5% or lower.

Figures 15, 16:
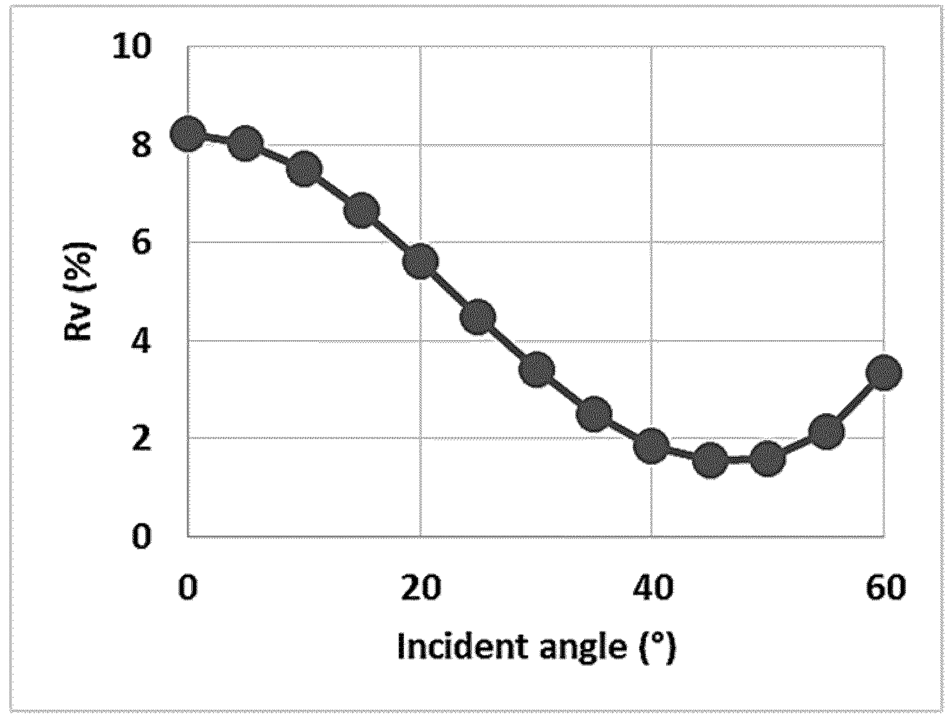
FIG. 15 is a schematic view showing the layer structure of an eighth non-limiting example of a mirror coating in an optical article according to the present disclosure.
FIG. 16 is a graph showing the variation of the mean visible light reflection factor Rv as a function of the incident angle for the eighth non-limiting example according to the present disclosure.

FIG. 15 shows the structure of an eighth non-limiting example of a mirror coating with low reflection at high incident angles and high reflection at low incident angles, coating a face of an optical article according to the present disclosure. As in FIG. 1, the left column of the layer structure gives the material of the considered layer and the right column gives its physical thickness.

The mirror coating shown in FIG. 15 is composed of alternating $Ta_2O_5$ (HI material) and $SiO_2$ (LI material) layers, composing a stack arranged on a hard coat ("HC") layer.

The graph of FIG. 16 shows a curve giving the variation of Rv for the mirror coating of FIG. 15 at different incident angles θ.

As shown in FIG. 16, Rv at low incident angles for the eighth example is higher, about 8% at 0°.

In the incident angle range 35°≤θ≤55°, Rv for the mirror coating according to the present disclosure is always lower than or equal to 2.5%.

Figures 17, 18:
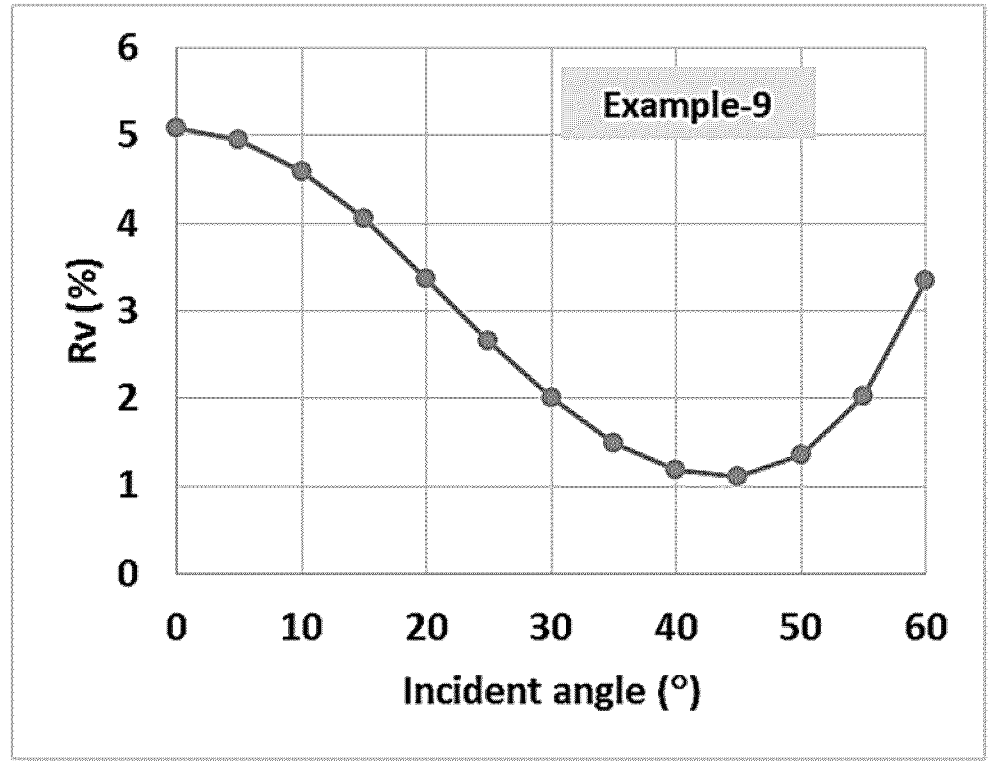
FIG. 17 is a schematic view showing the layer structure of a ninth non-limiting example of a mirror coating in an optical article according to the present disclosure.
FIG. 18 is a graph showing the variation of the mean visible light reflection factor Rv as a function of the incident angle for the ninth non-limiting example according to the present disclosure.

FIG. 17 shows the structure of a ninth non-limiting example of a mirror coating with low reflection at high incident angles and high reflection at low incident angles, coating a face of an optical article according to the present disclosure. As in FIG. 1, the left column of the layer structure gives the material of the considered layer and the right column gives its physical thickness.

The mirror coating shown in FIG. 17 is composed of alternating SiN (HI material) and $SiO_2$ (LI material) layers, composing a stack arranged on a hard coat ("HC") layer.

The graph of FIG. 18 shows a curve giving the variation of Rv for the mirror coating of FIG. 17 at different incident angles θ.

As shown in FIG. 18, Rv at low incident angles for the ninth example is higher, about 5% at 0°.

In the incident angle range 35°≤θ≤55°, Rv for the mirror coating according to the present disclosure is always lower than or equal to 2%. In the range 35°≤θ≤50°, Rv for the mirror coating according to the present disclosure is even about 1.5% or lower.

Figures 19, 20:
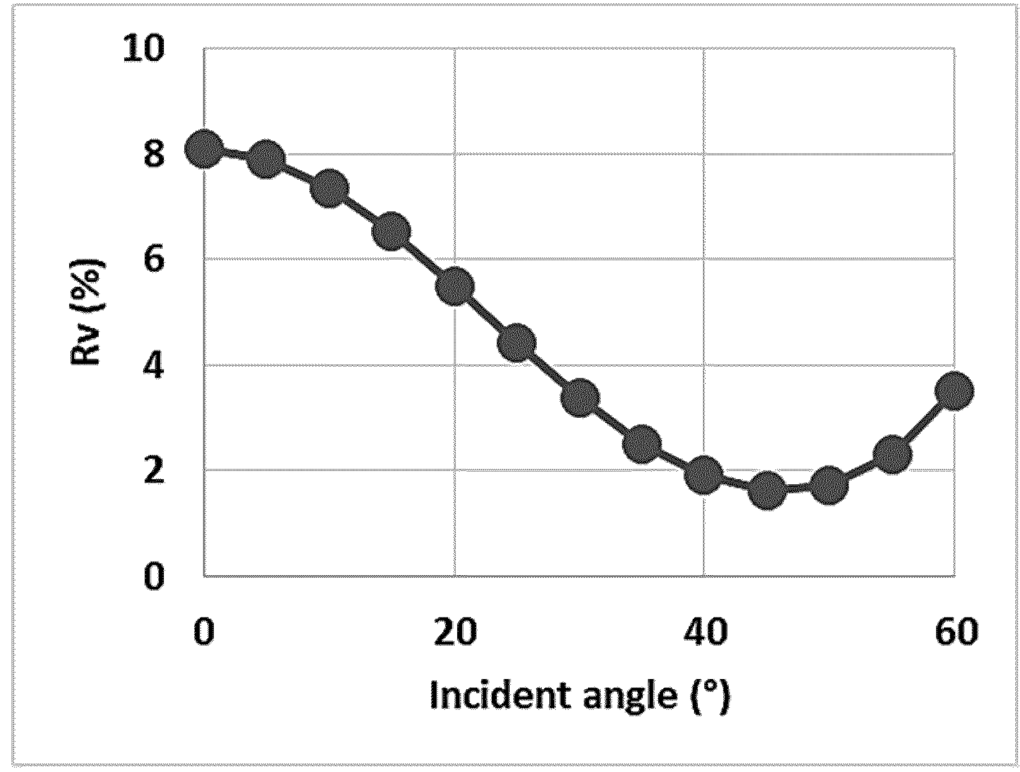
FIG. 19 is a schematic view showing the layer structure of a tenth non-limiting example of a mirror coating in an optical article according to the present disclosure.
FIG. 20 is a graph showing the variation of the mean visible light reflection factor Rv as a function of the incident angle for the tenth non-limiting example according to the present disclosure.

FIG. 19 shows the structure of a tenth non-limiting example of a mirror coating with low reflection at high incident angles and high reflection at low incident angles, coating a face of an optical article according to the present disclosure. As in FIG. 1, the left column of the layer structure gives the material of the considered layer and the right column gives its physical thickness.

The mirror coating shown in FIG. 19 is composed of alternating $Nb_2O_5$ (HI material) and $SiO_2$ (LI material) layers, composing a stack arranged on a hard coat ("HC") layer.

The graph of FIG. 20 shows a curve giving the variation of Rv for the mirror coating of FIG. 19 at different incident angles θ.

As shown in FIG. 20, Rv at low incident angles for the tenth example is higher, about 5.5% at 0°.

In the incident angle range 35°≤θ≤55°, Rv for the mirror coating according to the present disclosure is always lower than or equal to 2%. In the range 35°≤θ≤50°, Rv for the mirror coating according to the present disclosure is even about 1.5% or lower.

The table of FIG. 21 gives a summary of ranges of values of ROT and PT, as well as ranges of values of ratios L3/L2 and L3/H1 and the product L3×H1 for ROT and PT for the first to tenth examples.

The table of FIG. 22 gives a similar summary for the first to fourth comparative examples.

In an embodiment, the coating according to the disclosure may be a colored mirror coating, i.e. the mirror coating has a predetermined color.

Sunglasses according to the disclosure may be provided with one more (generally two) lenses having features of the optical articles as described above.

Although representative optical articles and sunglasses have been described in detail herein, those skilled in the art will recognize that various substitutions and modifications may be made without departing from the scope of what is described and defined by the appended claims.

The invention claimed is:

1. An optical article having a back face on the side of a wearer's eye, a front face opposite to said back face, wherein said optical article has, on at least one of said front and back faces, an interferential multilayer coating comprising a stack of at least one layer of high refractive index material having a refractive index higher than 1.55 and at least one layer of low refractive index material having a refractive index of 1.55 or less, the refractive indexes being expressed for a wavelength of 550 nm, said optical article being designed in such a manner that it has high reflective properties for low incident angles higher than or equal to 0° and lower than or equal to 15° when viewing said article from its front or back face and antireflective properties for high incident angles higher than or equal to 35° and lower than or equal to 55° when viewing said article from its front or back face, the mean visible light reflection factor Rv of said coating for visible light hitting said front or back face being lower than or equal to 2.5% at an angle of incidence with respect to a perpendicular to said front or back face that is higher than or equal to 35° and lower than or equal to 55°; and the mean visible light reflection factor Rv of said coating for visible light hitting said front or back face being higher than or equal to 2.5% at an angle of incidence with respect to a perpendicular to said front or back face that is higher than or equal to 0° and lower than or equal to 15°.

2. The optical article according to claim 1, wherein said mean visible light reflection factor Rv for backward reflection is lower than or equal to 2%, more preferably lower than or equal to 1.5% when said angle of incidence is higher than or equal to 35° and lower than or equal to 50°.

3. The optical article according to claim 1, wherein said mean visible light reflection factor Rv is higher than or equal to 3.5% when said angle of incidence is higher than or equal to 0° and lower than or equal to 10°.

4. The optical article according to claim 1, wherein the ratio between Rv(0°), the Rv value at an angle of incidence perpendicular to said front or back face and Rvmin(35°-50°), the minimum Rv value at an angle of incidence with respect to a perpendicular to said front or back surface that is higher than or equal to 35° and lower than or equal to 50°, is higher than 3, preferably higher than 4, more preferably higher than 5.

5. The optical article according to claim 1, wherein the ratio between Rv(10°), the Rv value at an angle of incidence with respect to a perpendicular to said front or back face that is equal to 10° and Rvmin(35°-50°), the minimum Rv value at an angle of incidence with respect to a perpendicular to said front or back surface that is higher than or equal to 35° and lower than or equal to 50°, is higher than 3, preferably higher than 4, more preferably higher than 5.

6. The optical article according to claim 1, wherein said coating comprises alternating layers of a high refractive index material and a low refractive index material, said alternating layers comprising, from an innermost layer to an outermost layer:

a first high refractive index material layer (H1), having a physical thickness ranging from 15 to 50 nm and a relative optical thickness ranging from 0.05 to 0.20, the relative optical thickness being defined as ROT=PT×$n_{550}$/550, where PT is the physical thickness and $n_{550}$ is the refractive index at 550 nm;

a first low refractive index material layer (L1), having a physical thickness ranging from 10 to 80 nm and a relative optical thickness ranging from 0.04 to 0.20;

a second high refractive index material layer (H2), having a physical thickness ranging from 40 nm to 100 nm and a relative optical thickness ranging from 0.10 to 0.50;

a second low refractive index material layer (L2), having a physical thickness ranging from 180 nm to 300 nm and a relative optical thickness ranging from 0.40 to 0.90;

a third high refractive index material layer (H3), having a physical thickness ranging from 50 nm to 120 nm and a relative optical thickness ranging from 0.15 to 0.50; and a third low refractive index material layer (L3), having a physical thickness ranging from 80 nm to 150 nm and a relative optical thickness ranging from 0.20 to 0.40.

7. The optical article according to claim 6, wherein:

the physical thickness ratio between said third low refractive index material layer (L3) and said second low refractive index material layer (L2) is lower than 0.5 and the relative optical thickness ratio between said third low refractive index material layer (L3) and said second low refractive index material layer (L2) is lower than 0.5;

the physical thickness ratio between said third low refractive index material layer (L3) and said first high refractive index material layer (H1) is higher than 3 and the relative optical thickness ratio between said third low refractive index material layer (L3) and said first high refractive index material layer (H1) is higher than 2.2; and the product of the physical thickness of said third low refractive index material layer (L3) and said first high refractive index material layer (H1) is lower than 5000 and the product of the relative optical thickness of said third low refractive index material layer (L3) and said first high refractive index material layer (H1) is lower than 0.05.

8. The optical article according to claim 1, wherein said high refractive index material is SiN, $TiO_2$, $PrTiO_3$, $LaTiO_3$, $ZrO_2$, $Ta_2O_5$, $Y_2O_3$, $Ce_2O_3$, $La_2O_3$, $Dy_2O_5$, $Nb_2O_5$, $HfO_2$, $Sc_2O_3$, $Pr_2O_3$, $Al_2O_3$, or $Si_3N_4$ and said low refractive index material is $SiO_2$, $MgF_2$, $ZrF_4$, $Al_2O_3$, $AlF_3$, chiolite $Na_3[Al_3F_{14}]$, cryolite $Na_3[AlF_6]$, or any mixture thereof, preferably $SiO_2$ or $SiO_2$ doped with $Al_2O_3$ with from 1 to 10% by weight, more preferably from 1 to 8% by weight of $Al_2O_3$ relative to the total weight of $SiO_2$ and $Al_2O_3$ in said low refractive index material layer.

9. The optical article according to claim 8, wherein said high refractive index material is $ZrO_2$, $Ta_2O_5$, $Nb_2O_5$, SiN or $TiO_2$ and said low refractive index material is $SiO_2$ or $SiO_2$ doped with $Al_2O_3$ with from 1 to 10% by weight, more preferably from 1 to 8% by weight of $Al_2O_3$ relative to the total weight of $SiO_2$ and $Al_2O_3$ in said low refractive index material layer.

10. The optical article according to claim 9, wherein said coating comprises alternating layers of a high refractive index material and a low refractive index material, said alternating layers comprising, from an innermost layer to an outermost layer:

a layer of $ZrO_2$, $Ta_2O_5$, $Nb_2O_5$, SiN or $TiO_2$ having a thickness of 20-40 nm;

a layer of $SiO_2$ or $SiO_2$ doped with $Al_2O_3$ with from 1 to 10% by weight, more preferably from 1 to 8% by weight of $Al_2O_3$ relative to the total weight of $SiO_2$ and $Al_2O_3$ in said low refractive index material layer having a thickness of 10-80 nm;

a layer of $ZrO_2$, $Ta_2O_5$, $Nb_2O_5$, SiN or $TiO_2$ having a thickness of 46-95 nm;

a layer of $SiO_2$ or $SiO_2$ doped with $Al_2O_3$ with from 1 to 10% by weight, more preferably from 1 to 8% by weight of $Al_2O_3$ relative to the total weight of $SiO_2$ and $Al_2O_3$ in said low refractive index material layer having a thickness of 180-300 nm;

a layer of $ZrO_2$, $Ta_2O_5$, $Nb_2O_5$, SiN or $TiO_2$ having a thickness of 50-120 nm;

a layer of $SiO_2$ or $SiO_2$ doped with $Al_2O_3$ with from 1 to 10% by weight, more preferably from 1 to 8% by weight of $Al_2O_3$ relative to the total weight of $SiO_2$ and $Al_2O_3$ in said low refractive index material layer having a thickness of 80-150 nm.

11. The optical article according to claim 1, wherein said optical article is an ophthalmic lens, a device having a safety wall intended to face said wearer's eye, an optical filter, or an optical film or patch intended to be fixed on a substrate.

12. Sunglasses, wherein said sunglasses comprise at least one optical article according to claim 1.

* * * * *